United States Patent
Hoover

(10) Patent No.: US 8,203,577 B2
(45) Date of Patent: Jun. 19, 2012

(54) PROXIMITY BASED COMPUTER DISPLAY

(75) Inventor: Paul Hoover, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 11/903,949

(22) Filed: Sep. 25, 2007

(65) Prior Publication Data

US 2009/0079765 A1    Mar. 26, 2009

(51) Int. Cl.
G09G 5/00 (2006.01)
(52) U.S. Cl. .................................................... 345/661
(58) Field of Classification Search .............. 345/661, 345/671, 156; 715/800, 866, 862
See application file for complete search history.

(56) References Cited

U.S. PATENT DOCUMENTS

| | | | | |
|---|---|---|---|---|
| 5,870,106 A * | 2/1999 | Langelaan | | 345/441 |
| 6,292,197 B1 * | 9/2001 | Langelaan | | 345/621 |
| 6,476,830 B1 * | 11/2002 | Farmer et al. | | 715/769 |
| 6,567,101 B1 | 5/2003 | Thomas | | |
| 6,690,275 B2 | 2/2004 | Long et al. | | |
| 6,971,072 B1 * | 11/2005 | Stein | | 715/866 |
| 7,203,911 B2 | 4/2007 | Williams | | |
| 7,461,352 B2 * | 12/2008 | Katsuranis | | 715/800 |
| 7,600,192 B1 * | 10/2009 | Hashimoto et al. | | 715/802 |
| 2003/0093600 A1 | 5/2003 | Perala et al. | | |
| 2003/0158736 A1 * | 8/2003 | James et al. | | 704/270.1 |
| 2003/0210258 A1 | 11/2003 | Williams | | |
| 2003/0234799 A1 | 12/2003 | Lee | | |
| 2004/0246272 A1 | 12/2004 | Ramian | | |
| 2005/0071172 A1 * | 3/2005 | James | | 704/275 |
| 2005/0091297 A1 * | 4/2005 | Sato et al. | | 708/442 |
| 2005/0229200 A1 * | 10/2005 | Kirkland et al. | | 725/12 |
| 2006/0161871 A1 * | 7/2006 | Hotelling et al. | | 715/863 |
| 2007/0046628 A1 * | 3/2007 | Lee et al. | | 345/156 |

OTHER PUBLICATIONS

"The Airbook: Force-Free Interaction With Dynamic Text in an Assistive Reading Device," http://xenia.media.mit.edu/~mbb/papers/airbook.pdf, 2 pgs.

"Using Natural Human Behavior as an Input Method to Enhance Information Retrieval," http://web.media.mit.edu/~taemie/data/ETRI_ProgressReport.doc, 20 pgs.

International Search Report dated May 27, 2009, from corresponding International Application No. PCT/US2008/072239.

* cited by examiner

Primary Examiner — Ryan R Yang
(74) Attorney, Agent, or Firm — Wolf, Greenfield & Sacks, P.C.

(57) ABSTRACT

A computer that can alter display the format or content of a computer display in response to context information indicating the proximity of a user to the display. Such a display may enable a person to make better use of information organization and delivery capabilities of the computer as the person engages in an active task. While the person is close to the display, the computer may present text in a relatively smaller size and information allowing interaction with the computer, such as objects that implement control functions, may be displayed. When the person is further from the display, the computer may present text in a relatively larger size and may omit control objects from the display to create space for the larger size text.

20 Claims, 4 Drawing Sheets

PROXIMITY BASED COMPUTER DISPLAY

BACKGROUND

People use computers for many activities in both home and business settings. Computers can help people organize information they have collected or retrieve new information over the Internet or from other sources. Often, this information is presented to a person using the computer on a visual display device, such as an LCD panel.

Information for presentation to a user is often generated by applications executing on the computer. In many computers, the display is created by display interface software within the operating system of the computer. Applications may specify information for display as objects, which are processed by the display interface software to create a desired appearance on the display device.

In some instances, information from one application may be presented in one or more "windows" allocated to that application. The display interface software may present information from multiple applications in different windows simultaneously. In addition, the display interface software may present in each window, or at other places on the display, objects defined by the operating system. For example, the display interface software may provide across the bottom of the display a "task tray" or "menu bar" defined by the operating system to indicate applications that are running or available to run on the computer.

The displayed objects may be in any of a number of forms. In a simple form, an object may be a collection of text. Though, some operating systems support more complex objects. For example, the text may be formatted into a list object. In addition, objects could include icons or other graphical elements alone or in combination with text. Alternatively, an object could define a control such that when a user selects the location on the display device where that control object is displayed, the computer will execute a function associated with the control. Frequently, the user selects the control using a mouse or other pointing device that allows the user to position a cursor at a specific location on the display and indicate a selection, such as by clicking a button. Though, some devices also have touch screens, allowing the user to directly indicate a selection of a control object at a particular location of the display.

In some scenarios, a user may influence the appearance of information on a display, either by configuring the application or the display software within the operating system. Configuring the application may cause the application to change the nature or format of information generated for display. Configuring the display software can change the resolution with which information is generated for display, which can influence the size or position of objects on the display. In addition, a user may alter the size or position of objects on the display by changing settings of the display device.

SUMMARY OF INVENTION

In scenarios in which computers are used to present information to a user engaged in an active task, the proximity of the user to a display device may change as the user performs the task. The computer system may adjust the size, format, amount of information displayed or other display characteristics so that the display provides information in a format that is useful for the user during performance of the active task.

The computer system may adjust the display characteristics based on context information indicating the proximity of the user to the display. Context information concerning the proximity of the user may be obtained automatically, using a proximity sensor on the display device. Alternatively, context information many be obtained through user input, such as through a control on the display or elsewhere on the display device or through a remote control operated by the user.

In some embodiments, different display modes may be implemented by the operating system of the computer based at least in part on attributes for objects generated by application programs. The attributes may specify the size with which certain objects should be displayed, depending on proximity of the user to the display device. Alternatively or additionally, the attributes may specify which objects are to be displayed in each mode or other display characteristics applicable to each mode.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
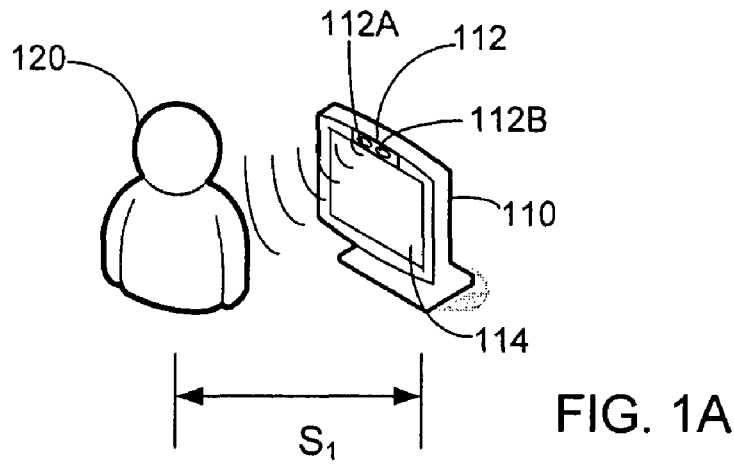
FIG. 1A is a sketch of a computer system operating in a first mode based on proximity of a user to a display device.

The inventor has appreciated that the manner in which people will want to interact with their computers will change as computers become more widely used in applications outside of a traditional office setting. As people use computers in conjunction with active tasks, rather than sitting in front of a computer as in a traditional office setting, people will move around a room containing the computer, sometimes being in close proximity to the computer, and sometimes being further from the computer. The inventor has appreciated that, for computers that are used to provide information to a person through a visual display, this changing proximity makes it difficult to define an appropriate interface. To provide a more desirable user experience, a computer may be configured with a framework that alters the format and/or type and/or amount of information displayed based on context relating to the proximity of the user to the display device.

In some modes, the person may desire to have objects conveying information presented with a large size, to facilitate viewing the information from a distance or to make it easy to see while the person is moving around a room containing the computer. For example, text could be displayed in a large font. Likewise, graphic elements could be scaled to a larger size to implement a "far mode." In contrast, if the user is using the computer in a more stationary mode, the user may more quickly assimilate information conveyed by text or graphic components if more information is displayed simultaneously. A "near mode" in which text or other objects are displayed with a smaller size may allow such a presentation of information.

The displays in near and far modes may differ in other ways than size of objects. In far mode, the person is unlikely to need control objects displayed because the person either may be too far from the display device to use an input device to select a control object or may be engaged in active tasks such that providing input would be a distraction. Accordingly, when displaying information for a person in a far mode, some or all of the control objects that allow control over executing applications or operating system functions may be omitted from the display. Omitting control objects may reduce screen clutter or may free up space on the display for other objects to be displayed in a large size. However, by displaying those objects in a "near mode," the full range of functionality the computer user may desire will be available when the user is close enough to the display device to use those objects.

Other types of objects also may have display formats that are context dependent. For example, a set of instructions for a task may include text providing a rationale for each step or details of where to obtain materials to perform the step. Such information may be of use to a person planning for or evaluating the task. However, for a person moving around a room while performing the task, the detail information may not be important. Rather that person may have a better experience using the computer if instructions for each step of the task are clearly displayed in a large size that can be easily seen from multiple locations throughout the room. In far mode, the detail information may be omitted from the display to provide a better user experience. Nonetheless, that detail information may be useful in other contexts. Consequently, when the user is in a near mode, the additional detail may be displayed. Accordingly, a display framework supporting proximity-based display modes may allow different amounts of information to be displayed in different modes.

Context information indicating an appropriate operating mode for a display device may be obtained in any of a number of ways. As one example, proximity of a user to a display device, which may be measured using a transducer or other sensor on the display device, may indicate context. In other embodiments, user input may specify the context and may be provided to the computing device through a user control associated with the display device or via a remote control or in any other suitable fashion.

To simplify operation of a computer system in two or more context-dependent modes, a display interface component within the operating system for the computer may provide a framework that implements multiple display modes based on context. The display interface component may contain an application programming interface (API) configured to receive descriptions of objects to be displayed. These descriptions may come from application components or from within the operating system. The API may receive in conjunction with the indication of each object an indication of the mode or modes in which the object is to be displayed and other information describing display attributes of the object, which may also be mode dependent. The display interface component may then define an appropriate display by applying context information to identify a mode of operation and rendering a display containing objects specified for that mode having display attributes specified for that object in the determined mode.

Any number of operating modes may be supported. In some embodiments, two modes, one near mode and one far mode, may be supported. Far mode, for example, may be triggered by context information indicating that a user is too far from the display device to be using the computer as in a traditional office setting and is likely moving about the area of the computer. Near mode, conversely, may be triggered by context information indicating that the user is positioned close enough to the display device to use traditional input devices, such as a touch screen or a mouse. As a specific numeric example, near mode may be triggered when a person is about 2 feet (60 cm) or less from the display device. Far mode may be triggered when the person is more than this distance form the display device.

However, if context information is available to indicate with finer resolution the position of the user, more than two modes may be supported. For example, different modes may be provided in which the size of objects displayed increases in relation to the distance separating the user and the display device. Alternatively or additionally, the number or type of objects displayed may decrease in relation to that distance.

FIG. 1A illustrates a display device 110 that supports multiple modes of operation. Display device 110 includes a display area 114. Display area 114 may be created using components as are known in the art. For example, display area 114 may be created using a cathode ray tube (CRT) or a liquid crystal display (LCD) panel. However, the specific mechanism used to implement display area 114 is not critical to the invention and any suitable components, whether now known or hereafter developed may be used to implement display area 114.

To facilitate use of display device 110 in a computer system that supports proximity-based modes of operation, display device 110 may include proximity sensor 112. As illustrated in FIG. 1A, proximity sensor 112 is positioned to generate data indicating the proximity of a user 120 to display area 114.

Proximity sensor 112 may be an active sensor, containing a transmitter 112A and a receiver 112B. In operation, transmitter 112A emits energy. If a user 120 is near display area 114, the emitted energy may reflect from user 120 and be received at receiver 112B. The magnitude of the energy received at receiver 112B may provide an indication of the proximity of user 120 to display area 114.

In the embodiment illustrated, proximity sensor 112 may be an acoustic transducer. For example, transmitter 112A may generate ultrasonic energy. However, other types of transducers may be used. For example, an infrared transmitter/receiver may be used as a proximity sensor. Accordingly, the specific technology used to implement a proximity sensor is not critical to the invention and any suitable type of transducer may be used.

In the scenario illustrated in FIG. 1A, user 120 is located a distance $S_1$ from display area 114. In this configuration, a sufficient amount of radiation from transmitter 112A is received at receiver 112B to indicate that user 120 is spaced from display area 114 by a distance that may be regarded to be near display area 114. In this scenario, a computer or other device generating content for display area 114 may use the output of receiver 112B to determine that information presented through display area 114 be formatted for near mode operation.

Figure 1B:
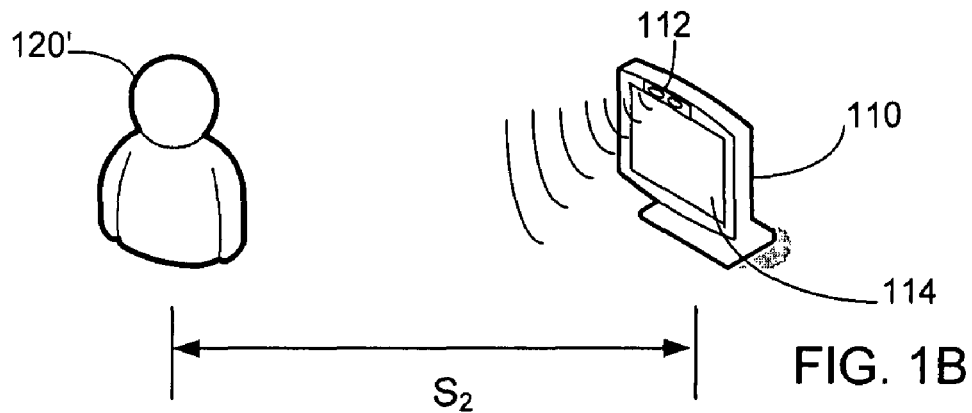
FIG. 1B is a sketch of the computer system of FIG. 1A operating in a second mode based on proximity of the user to the display device.

In contrast, FIG. 1B illustrates a scenario in which the user 120' has moved to a distance $S_2$ from display device 110. As illustrated in FIG. 1B, the distance $S_2$ is larger than the distance $S_1$ (FIG. 1A). Accordingly, the amount of radiation received at receiver 112B is smaller than the radiation received in the operating scenario illustrated in FIG. 1A. Accordingly, the output of receiver 112B indicates that the user is relatively far from display area 114 in the scenario of FIG. 1B. A computer or other device generating content for display area 114 may use this information to change the format of the information presented to user 120 through display 114.

Figure 1C:
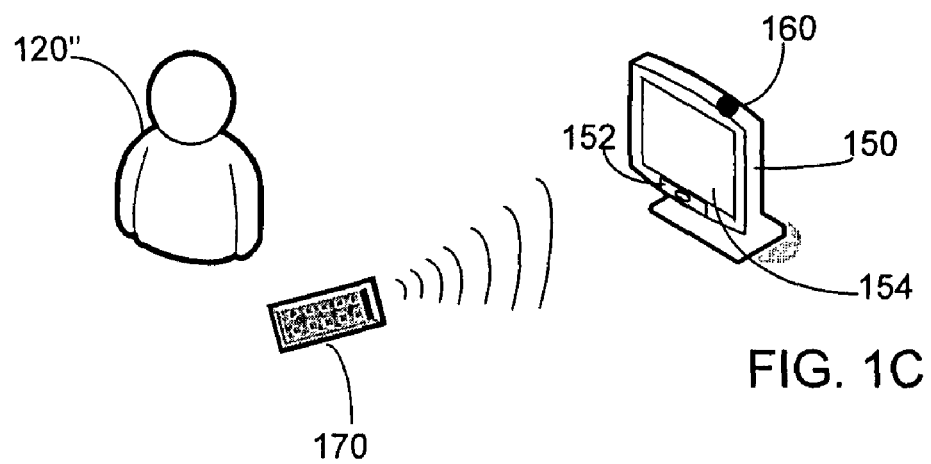
FIG. 1C is a sketch of an alternative embodiment of a computer system that supports proximity-based display modes.

In the embodiment illustrated in FIG. 1A and FIG. 1B, an active sensor is used to determine a proximity of a user to a display area 114. From these proximity measurements, a proximity-based context may be inferred. Context may also be determined in other ways. For example, FIG. 1C illustrates that direct user input may also provide context information. FIG. 1C shows a display device 150 with a display area 154. Display area 154 may be implemented as described above in connection with display area 114. However, any suitable mechanism may be used to implement display area 154.

In the embodiment illustrated in FIG. 1C, display device 150 includes alternate mechanism through which context information may be obtained. In the embodiment illustrated, context information may be obtained through direct user input. For example, display device 150 may contain a switch 160 that a user may operate to indicate a desired operating mode. For example, switch 160 may have two settings to indicate operation in a near mode or a far mode. However, such a switch may have any suitable number of settings to indicate any suitable number of operating modes.

More generally any suitable type of control may be used in conjunction with display device 150 to allow a user to specify a mode. For example, rather than a switch, the control could be implemented as a button or series of buttons that could be depressed to indicate one of a limited number of operating modes. Alternatively, a control could be implemented as a wheel or a dial that could be rotated to allow a user to specify an operating mode from a range of operating modes. Further, it is not necessary that the control be a mechanical control such as a switch, button or dial. A control allowing a user to specify an operating mode may be implemented using a "soft key" or other computer generated control on display 154.

Further, it is not necessary that the control be on display device 150. FIG. 1C illustrates that a user 120" may operate a remote control 170 that communicates a desired operating mode using energy transmitted from remote control 170. The energy transmitted may be IR, RF, acoustic or any other suitable form of energy. To ascertain a selected mode of operation based on energy transmitted by a user activating a remote control 170, a receiver for the type of energy transmitted may be incorporated into a computer system using display device 150. In the embodiment illustrated in FIG. 1C, receiver 152 is incorporated in display device 150 to receive commands from remote control 170. However, any suitable receiver located in any suitable location may be used to receive context information transmitted by a user from a remote location.

Regardless of how context information is generated, the context information may be used by generating information for display to alter the type, amount, formatting or other characteristic of information for presentation through a visual display.

Figure 2A:
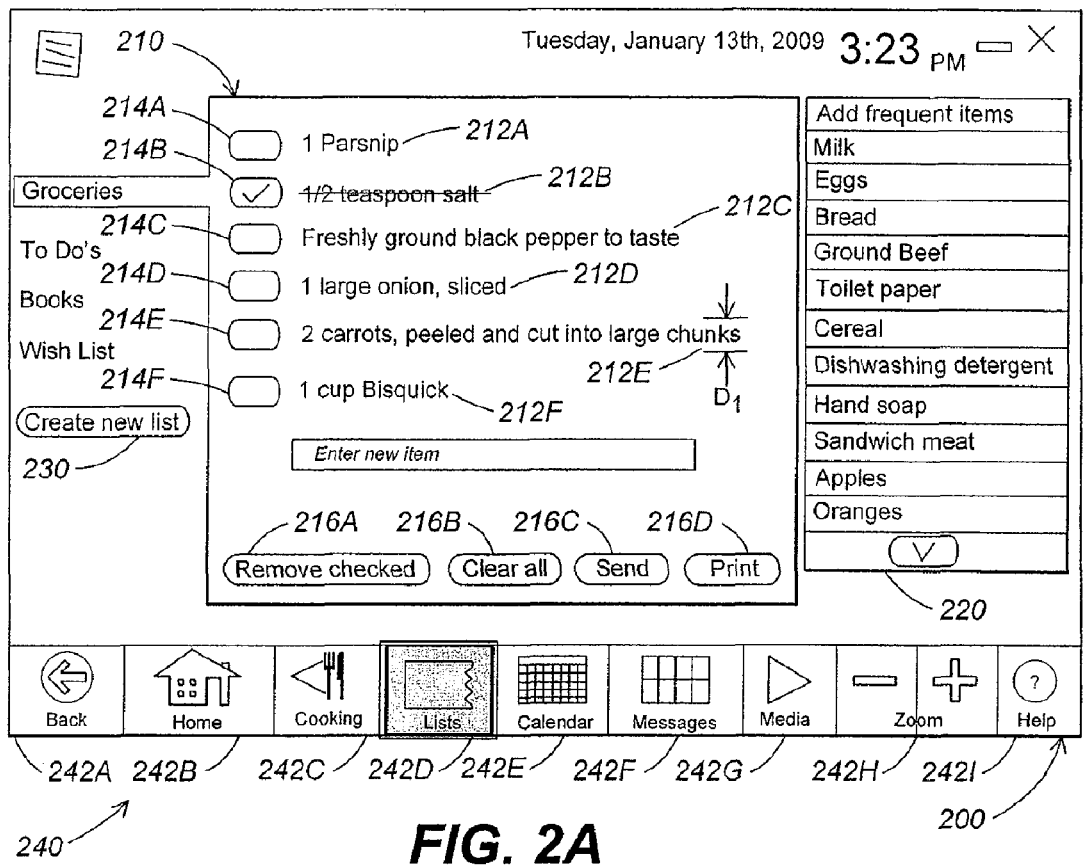
FIG. 2A is a sketch of a user interface presented to a user of a computer in a first proximity-based operating mode.

A home computer located in a kitchen provides an example of a computer system that can support multiple display modes. FIG. 2A illustrates a display that may be generated by such a computer system to organize information for home tasks. For example, user interface 200 may be generated by an application assisting a user organizing various home functions. In FIG. 2A, an application organizing lists is being used to create a shopping list.

In the embodiment illustrated, the application has generated a panel 210, listing items in a recipe that a user may wish to prepare. Items used in preparing the recipe are presented as text objects 212A, 212B ... 212F. Associated with each item is a control object 214A ... 214F, respectively. By selecting a control object 214A ... 214F, a user may indicate that the user has on hand a corresponding listed item and the item does not need to be purchased. For example, control 214B is shown having been selected. Accordingly, text object 212B is displayed in a strikethrough format, indicating to the user that an item described by that object does not need to be purchased.

Through this interface, a user may formulate a shopping list containing all of the items that are not indicated to be on hand. Other control objects may be included to aid the user in performing the task of creating the shopping list. For example, control 216A, when selected, may remove from the list displayed in panel 210 those items indicated to be on hand. Control 216B may be used to reverse selection of all items indicated to be on hand. Control 216C may be used to transmit the list to another application. For example, selecting control 216C may send the list of items to an application that sends a shopping list to a grocery delivering vendor. Alternatively, control 216D, when selected, may print the displayed list.

In addition, user interface 200 may contain other controls and information useful for a task such as creating a shopping list. For example, panel 220 may contain controls, that when selected by a user, add a frequently purchased item to the shopping list.

Other controls may allow the user to switch to different tasks within the list manager application. For example, control 230 may allow a user to create a different type of list.

Other controls presented through user interface 200 may allow a user to select different applications. For example, a menu bar 240 is displayed. Menu bar 240 contains menu bar objects 242A ... 242I, each representing a control that can be accessed to invoke a different function, possibly provided by a different application. In the embodiment illustrated, menu bar object 242D is shown selected. This operating state corresponds to the list manager application being used to create the shopping list presented in panels 210 and 220. Other menu bar objects may allow the user to access other applications. For example, menu bar object 242E may be selected by a user to access a calendar application. In the embodiment illustrated, menu bar 240 is generated based on information provided by an operating system for a computer rather than a specific application.

Menu bar 240 provides a mechanism for the user to switch between applications. Though other applications, when selected, may provide different information, they may contain similarities in the user interfaces displayed. For example, each application may generate text objects for display to the user. Control objects may be displayed in conjunction with the text objects. Also, operating system defined menus and controls may be displayed. Alternatively, other controls, graphic objects and other information may be presented through the user interface, regardless of the specific application being executed.

User interface 200 represents a user interface that may be presented when a user is interacting with the computer in a near mode. For example, multiple controls allowing the user to identify items to include or exclude in the list are included. Controls to allow the user to switch tasks or switch applications are also included. Such controls may be selected by a user through a mouse or other pointing device. Such interactions are most likely to occur when the user is near the display device. In this mode, text is presented with a size $D_1$. This size may be selected as appropriate for a user relatively near a display device presenting user interface 200.

However, user interface 200 displays information that may be of use to a user performing an active task. For example, a user may wish to move around the kitchen to check whether the items on the list in panel 210 are on hand. For example, a user may move to a refrigerator to check whether listed produce items are on hand. At another time, the user may move to a pantry or cupboard to check whether listed dry goods are on hand. In performing such an active task, the user may move away from display device presenting user interface 200. Text of size $D_1$ may not be clearly visible to the user when the user moves away from the display device.

Figure 2B:
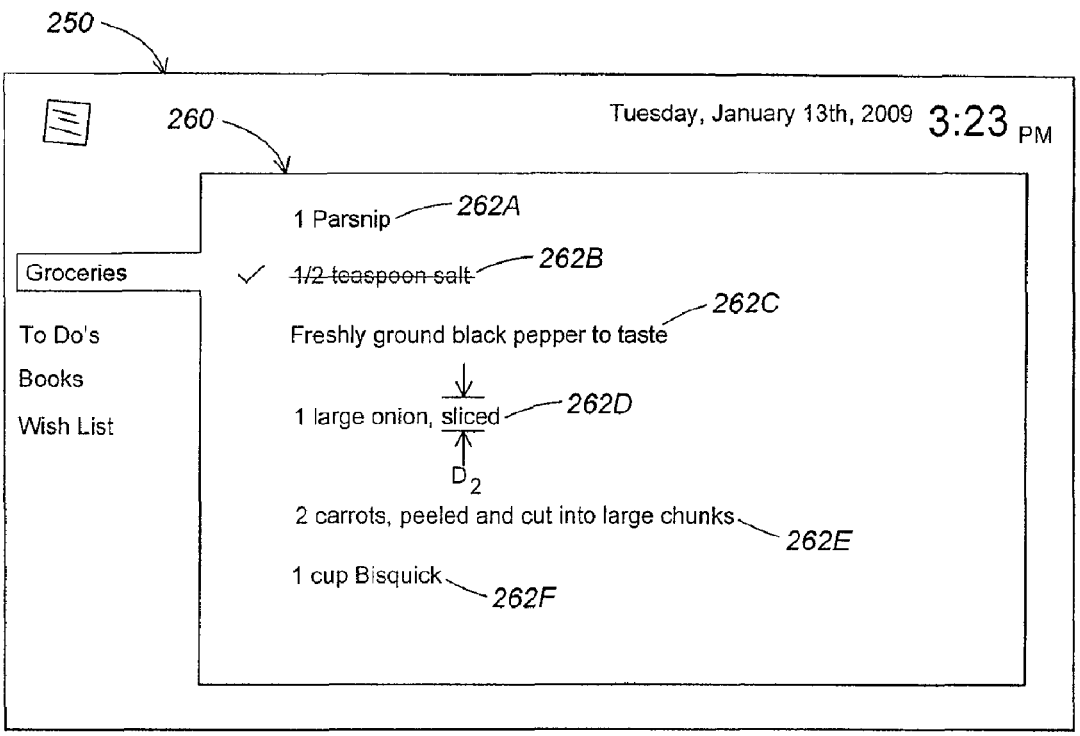
FIG. 2B is a sketch of a user interface presented to a user of a computer in a second proximity-based operating mode.

To provide an improved user experience, the nature, amount and size of the objects displayed may change when the user moves away from the display device. Accordingly, FIG. 2B illustrates an alternative user interface 250 that may be presented by a computer executing the list manager application illustrated in FIG. 2A in a far mode of operation.

In the embodiment illustrated, display panel 260 is included in user interface 250. Display panel 260, in this embodiment, contains the same information in text objects 262A . . . 262F as is provided through text objects 212A . . . 212F. However, the text associated with text objections 262A . . . 262F is presented with a size $D_2$. In this embodiment, size $D_2$ is larger than size $D_1$. Presenting information with objects of a larger size may enable a user to more readily view that information as the user performs the active task of moving about the kitchen and determining whether the items listed are on hand.

In the embodiment illustrated, panel 260 occupies a larger percentage of the display area than panel 210. Accordingly, more space is provided for displaying larger text information. The additional space for display of text objections may be created by presenting user interface 250 without some or all of the control objects that are available to a user interacting with a user interface 200 in near mode as illustrated in FIG. 2A. For example, menu bar 240 is not included in user interface 250. Likewise, panel 220 is omitted. Other controls such as 214A . . . 214F, 216A . . . 216D and 230 are also not included in user interface 250.

However, omitting these controls in far mode need not limit the functionality available to the user. In an embodiment in which user interfaces 200 and 250 are presented on a display device that incorporates a proximity sensor, as the user comes close enough to the display device to touch the screen or operate a mouse or other pointing device connected to a computer associated with the display device, the proximity sensor will determine that the user is interacting with the device in a near mode. The display may then contain the full range of control objects indicated in FIG. 2A. Consequently, the user interface on the display device may alternate between that shown in FIG. 2A and FIG. 2B depending on the proximity of the user to the display device.

As a specific example of a user experience that may be provided by a system that alters the user interface based on proximity information as illustrated in FIGS. 2A and 2B, a user may select a list as in the scenario illustrated by FIG. 2A. With user interface 200 visible on the display device, the user may select control 214B or other controls that add or remove items to the list being created. When the user needs to move to another location in the kitchen to determine whether items on the list are on hand, the display device may automatically transition to the user interface 250 depicted in FIG. 2B. In this mode, the user may readily read the text of the list on the display, even though the user has moved away from the display. When the user returns to the display device to indicate whether or not the listed items are on hand, the proximity sensor associated with the display device may indicate that the user has entered a near mode of operation. Upon detecting that the user is near the display device, a near mode user interface, such as user interface 200 may be displayed. Because this interface has control objects, the user may readily input information, indicating whether the listed items are on hand or otherwise perform functions through the user interface.

Figure 3:
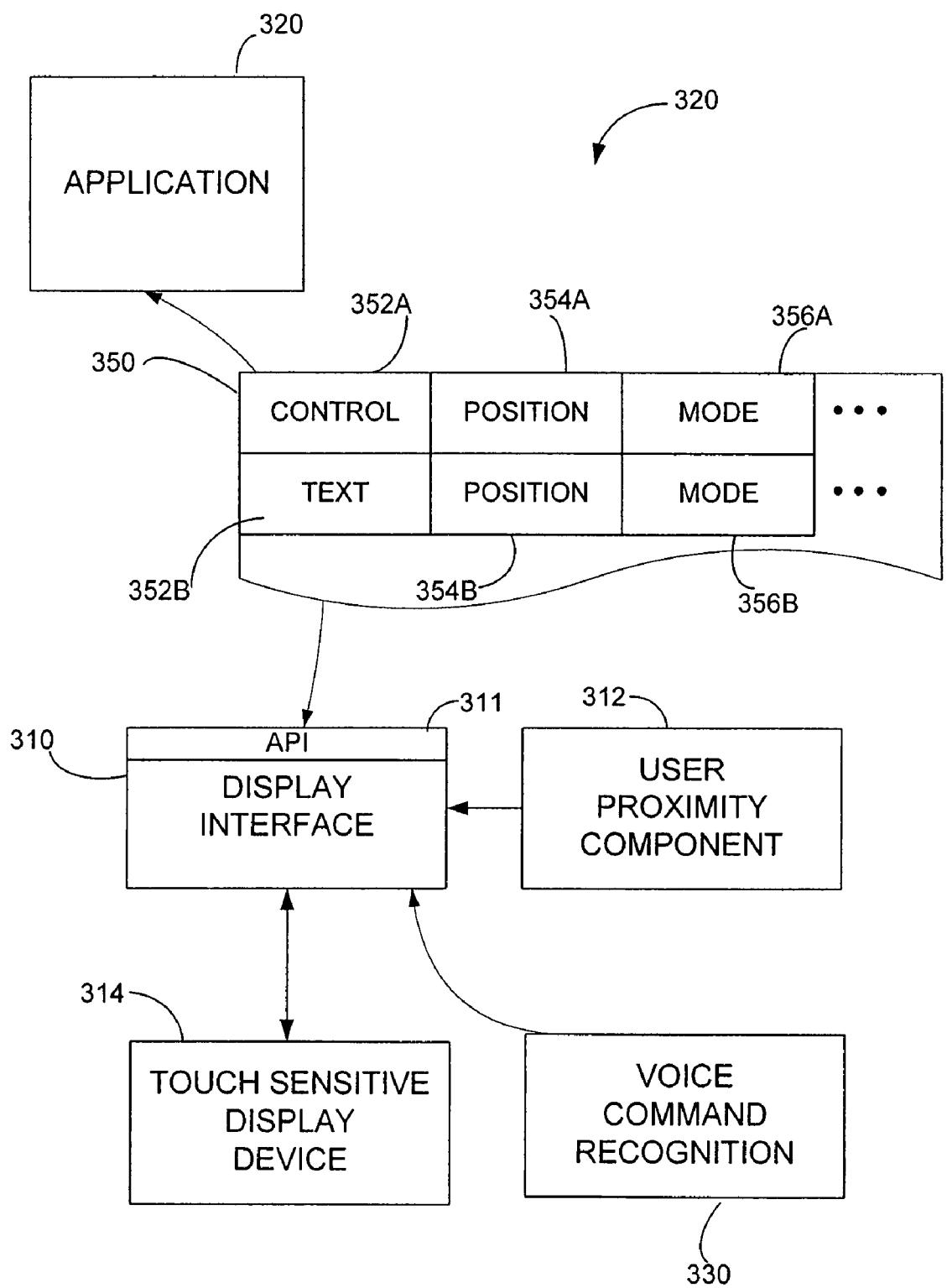
FIG. 3 is a block diagram illustrating a computer system according to an embodiment of the invention.

FIG. 3 illustrates a computer system capable of generating user interfaces as illustrated in FIGS. 2A and 2B based on user proximity. FIG. 3 illustrates a computer system 300 that may generate information for display on a display 314. Computer system 300 may be implemented with any suitable hardware or software components. For example, computer system 300 may be implemented using a desktop computer as is known in the art. The desktop computer may, for example, be connected through a cable to a display device, such as display device 110 (FIG. 1A) or display device 150 (FIG. 1C). Alternatively, computer system 300 may be implemented with a processor and other components integrated into a display device. Accordingly, the specific components used to implement computer system 300 are not critical to the invention.

FIG. 3 illustrates some of the components that may be present in an operating system of computer system 300. In the embodiment illustrated, display interface component 310, user proximity component 312 and voice command recognition component 330 may be software components implemented as part of an operating system of computer system 300. Such an operating system may include other components not illustrated in FIG. 3, but such components are not critical to the invention.

Regardless of the specific format of the hardware and operating system within computer system 300, these components may create a platform on which one or more applications may execute. FIG. 3 illustrates an application 320 that may execute in the environment created by the operating system and underlying hardware. One application is illustrated for simplicity, but any number and type of applications may execute on computer system 300.

In the embodiment illustrated, application 320 may be a list manager application, such as the application generating information for display through the user interfaces in FIGS. 2A and 2B. However, application 320 may be any suitable type of application.

As application 320 executes, it may generate information for display on display device 314. Application 320 may define this information by generating display content 350, describing information for display. Display content 350 may define objects with associated attributes. Any suitable mechanism may be used to represent display content and FIG. 3 provides a simplistic example to illustrate a manner in which an application may define different types or formats of information for display in different proximity-based modes.

In the example illustrated, display content 350 contains a row with fields 352A, 254A and 356A. These fields may contain information defining an object and its related attributes. For example, field 352A may contain information describing the type of objection for display. In the embodiment illustrated, field 352A indicates that a control object is to be displayed. Field 354A describes a position on display 314 in which that object should appear. Field 356A indicates the mode or modes in which the object is to be displayed. For example, in a computer system that implements a near and far mode, information in field 356A may indicate that the control object is to be displayed only when a near mode display is being presented. Alternatively, information in field 356A may indicate the control is to be displayed in both near and far modes or only in far mode. In embodiments in which more than two modes are supported, the information field 356A may indicate all of the modes in which the control object is to be displayed.

Other rows in display content 350 may identify other objects for display. These rows may indicate objects that display different types of information or may specify different formats for the same information in different modes.

In the example of FIG. 3, fields 352B, 354B and 356B may define a second object for display. Field 352B may indicate the type of object to be displayed. In this example, field 352B contains information indicating that a text object is to be displayed. Field 354B may indicate the position of that object. Field 356B may contain information indicating the mode or modes in which the object is to be displayed.

FIG. 3 illustrates display content 350 in simplistic form. Depending on the nature of the objects, different or additional attributes may be defined in conjunction with the object. For example, a control object may contain a description of functions to be performed when the control is selected. Text objects may contain information defining the font in which the text is to be displayed. In general, each object may contain attributes of a type recognized by display interface component 310. Accordingly, the specific format of display content 350 may depend on the implementation of display interface component 310.

Display interface component 310 may be a display interface as is known in the art. However, any suitable display interface component may be used. Regardless of the specific implementation of display interface 310, display interface 310 receives display content 350 through an application programming interface (API) 311. Display interface component 310 utilizes display content 350 to render the objects specified by display content 350 in a format that may be displayed on display device 314. Once rendered, display interface component 310 provides a representation to display device 314, which displays that representation, causing the objects identified in display content 350 appear.

In rendering this display, display interface component 310 may combine information from multiple applications, if computer system 300 is operating in a condition in which multiple applications are generating information for display. Additionally, display interface 310 may incorporate information generated by an operating system or other controlling software. For example, in the embodiment of FIG. 2A, objects generated by a list manager application are shown displayed in conjunction with menu bar 240, containing information generated by an operating system component.

Regardless of the sources of information provided to display interface component 310, display interface component 310 combines the information and renders an appropriate display. In the embodiment illustrated in which computer system 300 supports multiple modes of operation, display interface component 310 renders the information for display based on proximity information from which a desired mode of operation may be inferred. If proximity information indicates that computer system 300 is operating in a near mode, display interface component 310 may render a display containing only objects having attributes indicating that the objects should appear in a near mode display. Similarly, display interface component 310 may selectively incorporate into the display objects or other components generated by an operating system based on the mode of operation indicated by the proximity information.

In computer system 300, display interface component 310 obtains proximity information from user proximity component 312. User proximity component 312 may be computer software, such as a driver, that interfaces with a proximity sensor, such as proximity sensor 112 (FIG. 1A). However, user proximity component 312 may obtain context information in any suitable way. For example, user proximity component 312 may interface with a switch 160 or a receiver 152 that receives command information from a remote control 170 (FIG. 1C).

Regardless of the source of context information provided by user proximity component 312, display interface component 310 may generate a display having characteristics appropriate for the mode identified by context information. Display interface component 310 may then generate some of the information displayed may signal for display 314, causing information in the desired format to be displayed.

In the embodiment illustrated in FIG. 3, computer system 300 contains a touch sensitive display. Accordingly, display device 314 may generate information indicating user selection of control objects appearing in the display area of display device 314. Information selecting a control object may be processed as in a computer system as is known in the art. For example, selection of a control object may cause the software code associated with the control object to be executed. However, the specific mechanism by which user input is processed is not critical to the invention and any suitable mechanism may be employed.

FIG. 3 illustrates an alternative mechanism by which a user may provide input. In the embodiment illustrated, computer system 300 includes a voice command recognition unit 330. Voice command recognition unit 330 may include a microphone or other input device suitable for obtaining input in voice form. Voice command recognition component 330 may perform speech recognition or other processing to convert voice signals into commands. The commands recognized by voice command recognition component 330 may be passed to display interface 310 to be processed in the same way as commands input through touching of touch sensitive display 314 or other user input.

Voice command recognition component 330 may allow a user to input commands associated with control objects that may not be displayed in the display area of display device 314. For example, FIG. 2B illustrates user interface 250 with no command objects displayed. Voice command recognition component 330 may provide a mechanism for a user to select objects that are displayed and to perform functions associated with those objects that may be available in the near mode display shown in FIG. 2A but are not available for mode display of FIG. 2B. For example, using simple voice commands such as "UP," "DOWN," and "SELECT," a user may specify, through voice commands, an item on a list. Those commands may be used to identify and select object 262B in the same way that a corresponding control object 214B in FIG. 2A may be selected by touching a touch-sensitive screen or manipulating a mouse to select control 214B.

Voice recognition command component 330 may recognize other commands useful for a display of information in a far mode. For example, expanding the size of text information in a list for display in far mode may reduce the amount of text that may be displayed simultaneously. Accordingly, only a portion of the text generated for display in a near mode format may appear simultaneously on a display of that information in far mode. To enable a user to see the full text, display interface component 310 may respond to a "SCROLL" command recognized by voice command recognition component 330. In this way, a user operating the computer system 300 in far mode may be able to view all available text without approaching the display device to place it in near mode.

Figure 4:
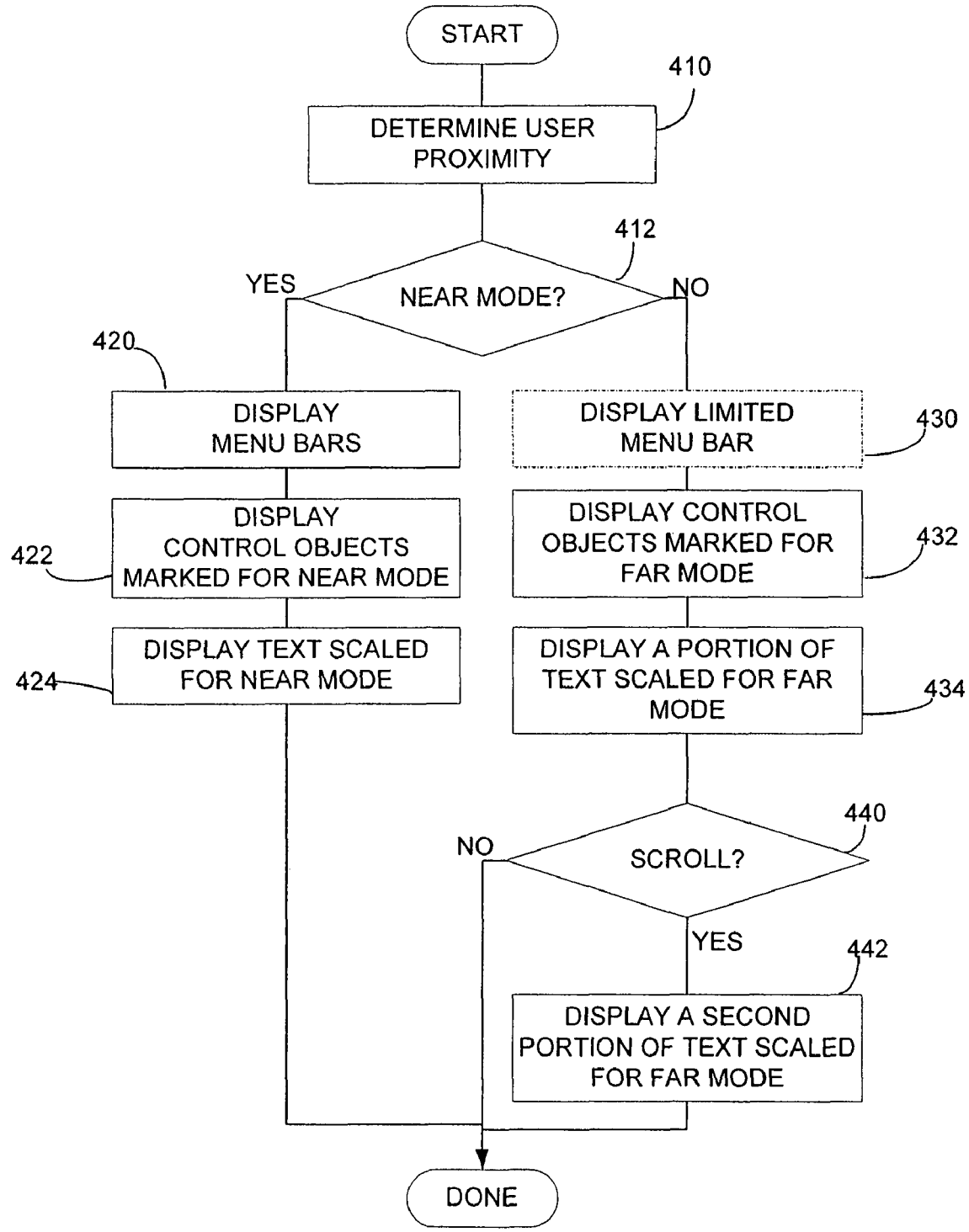
FIG. 4 is a flowchart of a process that may be performed by a computer system according to an embodiment of the invention.

A display device, such as illustrated in FIGS. 1A, 1B and 1C and a computer system such as illustrated in FIG. 3 may be used to perform a process presenting a user with information in different formats depending upon the context in which the user interacts with the computer system. FIG. 4 provides an example of such a process.

The process of FIG. 4 begins at block 410. At block 410, a proximity of a computer user relative to a display area is determined. As described above, any suitable mechanism for determining proximity may be used. Proximity may be determined by a sensor or other device that measures the user position. Alternatively, an indication of proximity maybe obtained by a user activated control. As a further example, proximity information maybe obtained from devices or systems external to the computer system. For example, motion detectors installed in a room maybe used to indicate user proximity to a display device.

An indication of proximity may also be obtained by drawing inferences from user action. For example, if a user does not interact with a computer system for a period of time, the system may transition into far mode. That period of time may depend on the applications executing on the computer or other context information. For example, if the computer is executing an application displaying lists of items or performing other output intensive operations, the computer may infer after a relatively short period of inactivity that the user is not in close proximity to the display device. In contrast, if an application requiring extensive input is being executed, even after a relatively long period of time without activity, the computer may still infer that the user is in close proximity. Accordingly, the specific mechanism used at block 410 to determine user proximity is not critical to the invention.

Regardless of how proximity is determined, the process branches at decision 412 based on the determined proximity. FIG. 4 illustrates two modes of operation, a near mode and a far mode. Accordingly, two paths from decision block 412 are shown.

If the determined proximity falls within a range corresponding to near mode, the process branches from decision block 412 to block 420. At block 420, the computer displays one or more menu bars, such as menu bars 240 (FIG. 2A). Menu bars displayed at block 420 maybe generated based on information provided by an operating system or other source. At block 422 the computer displays control objects marked for near mode display. In the embodiment illustrated in FIG. 3, the control objects displayed at block 422 may be generated by one or more applications. Alternatively or additionally, the control objects displayed at block 422 may be generated by operating system components or any other suitable source. However, because block 422 occurs in near mode processing, only control objects marked for near mode display are displayed at block 422.

At block 424, any text objects are scaled for near mode and displayed. Text objects may be generated by applications, operating system components or other suitable sources. Regardless of how generated, each text object may have one or more attributes associated with it. One such attribute may specify the size of the text. In an embodiment in which the near mode mimics normal operation of a computer without proximity-based display of information, scaling the text for display at block 424 may entail rendering the text in a size based on attributes specified in conjunction with the text.

Though not expressly shown in FIG. 4, near mode processing may continue displaying any other types of objects. However, once all objects specified for display have been displayed, near mode processing may end.

Conversely, if proximity information determined at block 410 indicates that the user is relatively far from the display device, processing may branch from decision block 412 to block 430. At block 430, processing in far mode may begin. Block 430 represents an optional step in far mode processing. In some instances, menu bars may not be displayed in far mode processing. Accordingly, no processing comparable to that performed at block 420 maybe performed in far mode. However, in some embodiments, processing in far mode may include display of a limited menu bar. At block 430, a limited menu bar may be displayed. For example, rather than displaying a menu bar, such as menu bar 240 (FIG. 2A) containing numerous menu bar objects, a menu bar maybe displayed at block 430 containing a limited number of menu bar objects. For example, a menu bar may be displayed at block 430 containing a single menu bar object allowing the computer to transition from far mode to near mode.

However, in the system illustrated in FIG. 3, display interface component 310 may display objects, including menu bars, in different modes depending on display content information provided in conjunction with descriptions of those objects. With this capability, an application or operating system may specify any desired format for menu bars in far mode. Consequently, a menu bar containing the same number of control objects displayed at block 420 for near mode processing is possible.

At block 432, the computer may display control objects marked for display in far mode. Because applications, operating system components and other components executing on the computer specify objects for display in each mode, processing at block 432 involves display of whatever objects are marked for display in far mode. The number and type of objects displayed at block 432 may depend on operation of the applications and other components that specify objects for display. In some embodiments, the number of control objects displayed at block 432 will be less then the number of display objects displayed at block 422 in near mode. In some embodiments, the control objects displayed at block 432 maybe a subset of the control objects displayed at block 422. However, the number of type of objects displayed at block 432 is not a limitation on the invention.

Processing in far mode continues at block 434. At block 434, text objects specified for display in far mode are displayed. In some embodiments, all text objects provided to a display interface component will be displayed in both near mode and far mode. In some embodiments, the size of the text maybe specified for each of near mode and far mode. In such embodiments, processing at block 434 may include scaling the text indicated for display in far mode in accordance with the size attributes specified with that text. In other embodiments, the size of text may be specified only for near mode. In such embodiments, processing at block 434 may include scaling the text to some multiple of the size specified for text display in near mode. In the embodiment illustrated in FIG. 4 where two modes of operation are supported, scaling the text may entail doubling the size of the text or otherwise increasing the size of the text by a predetermined multiplier. In other embodiments in which more than two display modes are supported, scaling the text at block 434 may entail multiplying the size of text in proportion to the distance between the display device and the user.

Regardless of the method used to identify an appropriate size for display of text in far mode at block 434, in the scenario illustrated in FIG. 4, scaling the text results in more text then can be displayed at one time. Accordingly, processing at block 434 entails displaying only a portion of the text scaled for far mode that will fit on the display at one time.

Once that portion of the text is displayed, the processing proceeds to decision block 440. At decision block 440, the process branches depending on whether a scroll command is received. The scroll command may be received in any suitable form. For example, in the embodiment of FIG. 330, the computer supports voice command inputs. Accordingly, the process may branch from decision block 440 to block 442 in response to a voice command indicating "scroll." In other embodiments, a scroll command may be received from a remote control device, such as remote control 170 (FIG. 1C) or other suitable source.

If no scroll command is received, the process may terminate. However, if the scroll command is received, the process may branch at decision block 440 to block 442. At block 442, a second portion of the text is displayed. The text displayed at block 442 may also be scaled. The scale factor used at block 442 may be the same scale factor used at block 434. However, any suitable method of scaling may be used at block 442.

Once the processing of block 442 is completed, the process of FIG. 4 may end. However, the process of FIG. 4 may be repeated each time new information is generated for display. The process of FIG. 4 may also be repeated each time the user proximity changes, control inputs are received or other suitable triggering events occur. In this way, the information displayed through the process of FIG. 4 may continuously reflect the user's proximity to the display device and other information indicating either a change in display or change in display content.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer having a display, the method comprising:
    determining the proximity of a user of the computer to the display based on whether the computer is performing highly output intensive operations or highly input intensive operations;
    displaying information in a first mode in response to determining that the computer is performing highly input intensive operations, wherein displaying information in the first mode comprises displaying a plurality of text objects with a first size;
    displaying information in a second mode in response to determining that the computer is performing highly output intensive operations, wherein displaying information in the second mode comprises displaying a first portion of the plurality of text objects with a second size, wherein the second size is larger than the first size;
    wherein:
        displaying information in the first mode further comprises displaying a control object; and
        displaying information in the second mode further comprises displaying the first portion without the control object.

2. The method of operating a computer of claim 1, further comprising:
    receiving a voice command input indicating a scroll command; and
    in response to the voice command input, displaying a second portion of the plurality of text objects.

3. The method of operating a computer of claim 1, wherein the control object comprises a menu bar object.

4. The method of operating a computer of claim 1, wherein the display is touch sensitive and the control object is a touch sensitive control object.

5. A computer system, comprising:
    a display area adapted to display content to a user;
    at least one input device adapted to receive input from the user, wherein the at least one input device comprises:
        a near input device which allows the user to provide input when in close proximity to the display area; and
        a far input device which allows the user to provide input when the user is not in close proximity to the display area, wherein the far input device is different from the near input device;
    a context component adapted to generate context information based on the type of input device used by the user of the computer system; and
    a display interface component adapted to control the content displayed to the user by the display area based at least in part on the context information.

6. The computer system of claim 5, wherein:
    the display area is further adapted to display content to the user in a first size when the user uses the near input device; and
    the display area is further adapted to display content to the user in a second size, larger than the first size, when the user uses the far input device.

7. The computer display device of claim 6, wherein the display area is further adapted to display less information to the user in a second size than is displayed to the user in the first size.

8. The computer system of claim 6, wherein:
    the display area is further adapted to display a control object when the user uses the near input device; and
    the display area is further adapted to not display the control object when the user uses the far input device.

9. The computer system of claim 5, wherein the display area is touch sensitive and the touch sensitive display area is the near input device.

10. The computer system of claim 5, wherein the far input device is a voice command input device.

11. The computer system of claim 5, wherein the far input device is a remote control.

12. The computer display device of claim 5, wherein:
    the at least one input device is further adapted to receive a scroll command; and
    the display area is further adapted to scroll through the display information in response to the scroll command.

13. The computer system of claim 5, wherein the near input device is a mouse.

14. A computer-readable medium having computer-executable components for execution on a computer having a display device, comprising:
    at least one application component for generating a plurality of objects;
    a context component for generating user context information based on whether the at least one application component is performing highly output intensive operations or highly input intensive operations;
    a display interface component adapted to receive the plurality of objects and the user context information and, the display interface component for rendering at least a portion of the plurality objects for display on the display device with a size based on the user context information;
    wherein:
        the size used on the display device is a first size when the at least one application component is performing highly input intensive operations and wherein the size used on the display device is a second size, bigger than the first size, when the at least one application component is performing highly output intensive operations.

15. The computer-readable medium of claim 14, wherein:
    the at least one application component is adapted for generating the plurality of objects with an indication of a mode for each of the plurality of objects in which the object is to be display; and
    the display interface component is adapted to selectively render objects for display based on the mode for the object and the user context information.

16. The computer-readable medium of claim 14, wherein at least a portion of the objects generated by the application component comprise text objects and the display interface component renders the text objects for display in a size dependent on the user context information.

17. The computer-readable medium of claim 14, wherein the context component comprises a user interface for receiving user input indicating display information in a near mode or a far mode.

18. The computer-readable medium of claim 17, wherein the user interface is adapted to receive information from a user operated remote control.

19. The computer-readable medium of claim 17, wherein the user interface is adapted to receive information from a user operated control on the display device.

20. The computer-readable medium of claim 17, wherein:

the user interface further receives user input indicating a scroll command; and the display interface component is further adapted to scroll through the objects for display, in response to the scroll command.

* * * * *